US010024693B2

(12) United States Patent
Sohler et al.

(10) Patent No.: US 10,024,693 B2
(45) Date of Patent: Jul. 17, 2018

(54) INDUCTIVE MEASURING PROBE AND METHOD FOR OPERATING AN INDUCTIVE MEASURING PROBE

(71) Applicant: ADDI-DATA GmbH, Rheinmuenster (DE)

(72) Inventors: Jean-Louis Sohler, Mundolsheim (FR); René Ohlmann, Batzendorf (FR)

(73) Assignee: ADDI-DATA GmbH, Rheinmuenster (DE)

( * ) Notice: Subject to any disclaimer, the term of this patent is extended or adjusted under 35 U.S.C. 154(b) by 104 days.

(21) Appl. No.: 15/039,157

(22) PCT Filed: Nov. 25, 2014

(86) PCT No.: PCT/DE2014/100413
§ 371 (c)(1),
(2) Date: May 25, 2016

(87) PCT Pub. No.: WO2015/078448
PCT Pub. Date: Jun. 4, 2015

(65) Prior Publication Data
US 2017/0138767 A1    May 18, 2017

(30) Foreign Application Priority Data

Nov. 26, 2013    (DE) .................. 10 2013 113 073

(51) Int. Cl.
*G01R 15/18*    (2006.01)
*G01D 5/22*    (2006.01)
*G01D 5/244*    (2006.01)

(52) U.S. Cl.
CPC ........ *G01D 5/2291* (2013.01); *G01D 5/24476* (2013.01)

(58) Field of Classification Search
CPC ........ G01L 27/007; G01L 1/14; G01L 5/0004; G01L 5/0038; A47L 11/4061;
(Continued)

(56) References Cited

U.S. PATENT DOCUMENTS 3,715,659 A    2/1973    Abnett et al.
5,107,210 A    4/1992    Shirao et al.
(Continued)

FOREIGN PATENT DOCUMENTS

CN    2615637 Y    5/2004
DE    40 31 931 A1    4/1992
(Continued)

OTHER PUBLICATIONS

International Search Report of PCT/DE2014/100413, dated Mar. 23, 2015.
(Continued)

*Primary Examiner* — Alesa Allgood
(74) *Attorney, Agent, or Firm* — Collard & Roe, P.C.

(57) ABSTRACT

The invention proposes an inductive measuring probe and a method for operating the measuring probe. The measuring probe is equipped with a movably arranged probe element, with a sensor (1) having a coil arrangement (14) and a core (15) which is arranged such that it can be displaced in relation to the coil arrangement (14) and which is connected to the probe element, wherein the sensor (1) converts a deflection of the probe element into an analog measurement signal, with an electrical reference component (2) which converts an analog input voltage into an analog output voltage, with a drive device which generates an identical analog input voltage for the sensor (1) and the reference component (2), with a processing device which determines the influence of disturbing effects from the analog output voltage of the reference component (2), and which deter-
(Continued)

Figure 1:
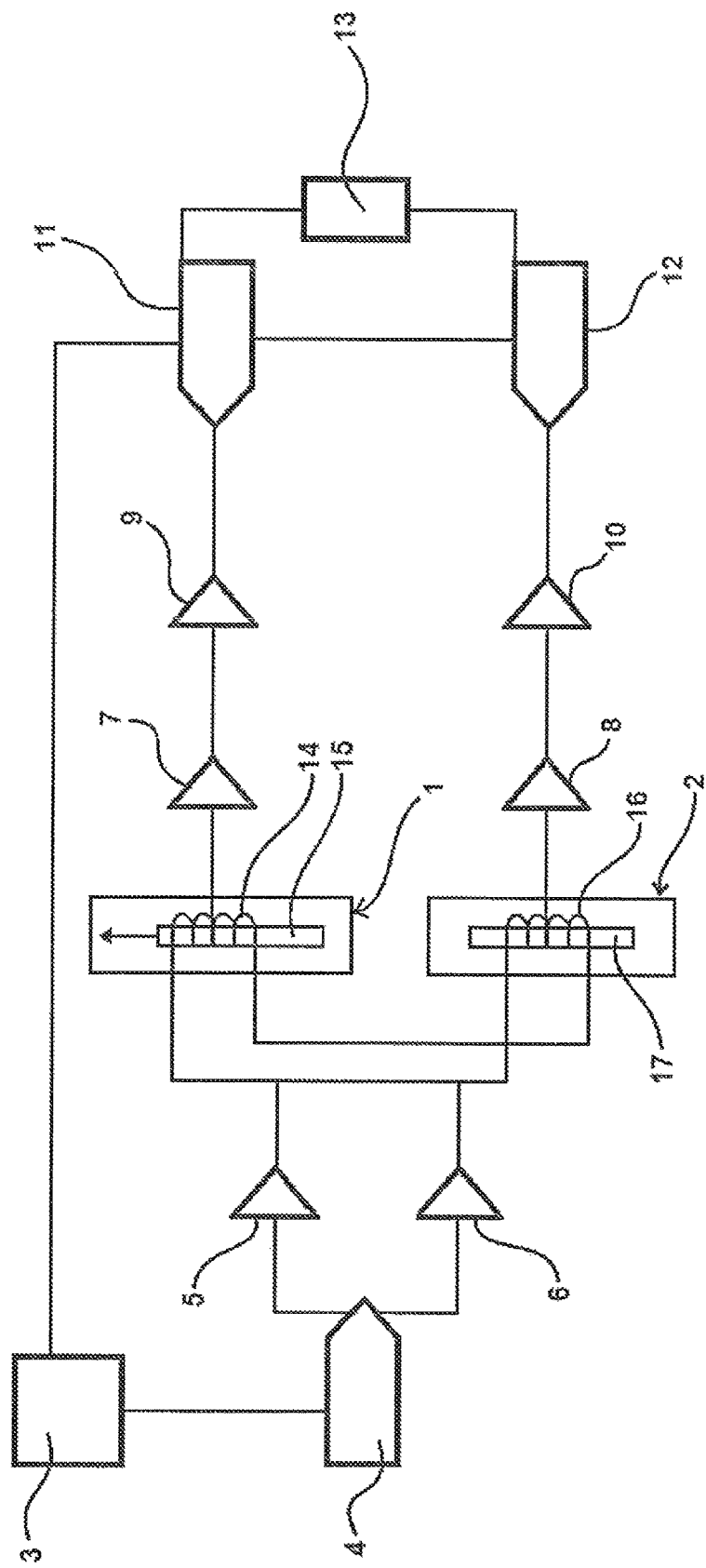

mines a measurement result from the measurement signal and the influence of disturbing effects.

17 Claims, 3 Drawing Sheets

(58) Field of Classification Search
CPC .. A47L 2201/04; A47L 9/009; A47L 2201/00; A47L 9/2805; G01R 15/202; G01R 19/0092; G01R 15/148; G01R 15/185
See application file for complete search history.

(56) References Cited

U.S. PATENT DOCUMENTS

| | | | |
|---|---|---|---|
| 6,600,311 B1 | 7/2003 | Tawaratsumida et al. | |
| 7,482,803 B2* | 1/2009 | Lee | G01D 5/2046 324/207.17 |
| 7,538,544 B2 | 5/2009 | Lee | |
| 2008/0082096 A1* | 4/2008 | Shores | A61B 18/1206 606/34 |

FOREIGN PATENT DOCUMENTS

| | | | |
|---|---|---|---|
| DE | 40 33 252 A1 | 4/1992 | |
| DE | 4031931 | * 4/1992 | ............... G01B 7/00 |
| DE | 690 10 873 T2 | 3/1995 | |
| DE | 103 22 447 A1 | 12/2004 | |
| EP | 1 058 094 A2 | 12/2000 | |
| SU | 1004746 A1 | 3/1983 | |

OTHER PUBLICATIONS

German Examination Report in DE 10 2013 113 073.9, dated May 28, 2014, with English translation of relevant parts.
English translation of the International Preliminary Report on Patentability and Written Opinion of the International Searching Authority in PCT/DE2014/100413, dated Jun. 9, 2016.
Office Action dated Jan. 31, 2018 from Chinese Application No. 201480064664.2.
Search Report dated Jan. 25, 2018 from Chinese Application No. 201480064664.2.
Russian Office Action in 2016125127/28(039339), dated Apr. 6, 2018.

* cited by examiner

INDUCTIVE MEASURING PROBE AND METHOD FOR OPERATING AN INDUCTIVE MEASURING PROBE

CROSS REFERENCE TO RELATED APPLICATIONS

This application is the National Stage of PCT/DE2014/100413 filed on Nov. 25, 2014, which claims priority under 35 U.S.C. § 119 of German Application No. 10 2013 113 073.9 filed on Nov. 26, 2013, the disclosure of which is incorporated by reference. The international application under PCT article 21(2) was not published in English.

The invention derives from an inductive measuring probe with a movably arranged probe element with a sensor with at least one coil and a core which is arranged such that it can be displaced in relation to the coil and which is connected to the probe, element, as well as a method for operating an inductive measuring probe.

Inductive measuring probes are used for example for length measurement in industrial manufacturing, quality assurance, process control, robot technology, aviation and aerospace, the automotive industry and in hydraulic and pneumatic applications. As well as lengths or distances, these devices can also be used to determine the parameters that can be derived from distances, such as the shape of an object. The measuring range extends from nanometers to meters. The principle of length measurement is based on the fact that the probe element is connected to a core that can be displaced relative to a coil arrangement. A displacement of the core relative to the coil arrangement produces a change in the inductance of the coil arrangement. The measuring device exhibiting the coils on the inductive measuring probe can in particular take the form of an inductive half-bridge, a full bridge or a differential transformer. A primary coil fed with a sinusoidal excitation voltage is coupled here with one or two secondary coils by a magnetically active core. The primary coil, the secondary coil and the magnetically active core are integrated here into the measuring probe. If the core connected to the probe element changes its position during length measurement, this affects the magnetic coupling between the primary coil and the secondary coil. The induced voltage in the secondary coil is here linearly dependent on the position of the movable core. The voltage of the secondary coil is therefore a measure of the change in position of the probe element. In addition, a change in inductance also influences the amplitude of the resonant circuit. A change in the position of the core therefore also results in a change in amplitude, which can be verified and serves as a measure of the distance to be measured.

A disadvantage here is that especially for measurements in the micro- and nanometer range, disturbing effects of the sensor the drive device and the processing device significantly distort the measurement result, producing considerable inaccuracies.

The invention is based on the problem of providing an inductive measuring probe and a method for operating an inductive measuring probe that provide measurement results of maximum accuracy and precision especially in the micro- and nanometer range.

This problem is solved by an inductive measuring probe having the features described herein and by a method having the features described herein. The inductive measuring probe according to the invention is characterized in that as well as the sensor it is equipped with an electrical reference component which converts an analog input voltage into an analog output voltage. A drive device generates an identical analog input voltage for the sensor and the reference component, A processing device combines the analog measurement signal of the sensor and the analog output voltage of the reference component into a low-noise, exact measurement result. The sensor, the reference component, the drive device and the processing device are part of a circuit configuration. The measurement signal of the sensor is registered at various measuring times. At each of the measuring times, the output voltage of the reference component is determined at the same time. A reference value or a reference function is formed from the output voltage of the reference component at several measuring times. At each measuring time the measurement signal of the sensor is corrected with a correction value or with a correction function that is determined from the output voltage of the reference component at the same measuring time, and the reference value or reference function.

It is assumed that the disturbing effects which influence the measurement signal of the sensor are essentially identical to the disturbing effects that influence the output voltage of the reference component. To that end the reference component is supplied with the same analog input voltage as the sensor. Furthermore, the output voltage of the reference component and the measurement signal of the sensor are processed by a common processing device. Influences of the excitation device and the processing device on the sensor and the reference component are therefore identical. Electrical disturbing effects which affect the output voltage of the reference component and the measurement signal are therefore the same.

The measurement signal is furthermore influenced by disturbing effects of the sensor. To eliminate the disturbing effects of the sensor equally in the measurement signal or at least to minimise them, a reference component is chosen where its electrical properties correspond at least approximately to those of the sensor, in particular with regard to impedance. It is beneficial that the impedance of the sensor in the zero point is identical to the impedance of the reference component at least in terms of magnitude. Under this condition it can be assumed that the disturbing effects of the sensor will in essence correspond to the disturbing effects of the reference component.

The reference component simulates the sensor in terms of its electrical properties. The conclusion is drawn from this that the disturbing effects that influence the reference component and the output voltage of the reference component are essentially the same as the disturbing effects that influence the sensor and the measurement signal of the sensor.

From determination of the voltage of the reference component at a specified input voltage at the same time as the measurement signals, the disturbing effects that influence the measurement signal can be determined with the reference component. With the help of the processing device, these disturbing effects can be removed from the measurement signal. In this way a very precise and exact measurement result is obtained.

It is furthermore an advantage if the components of the circuit exhibit minimal disturbing effects and the disturbing effects of the components influence the measurement signal minimally. Especially suitable, low-noise components are used for this purpose.

According to an advantageous embodiment of the invention, the reference component is a transformer. This, like the sensor, exhibits a coil arrangement. From the winding ratio of the coil arrangement, the ratio of input voltage to, output voltage is determined. On a transformer with a predefined input voltage, the output voltage is therefore defined.

According to a further advantageous embodiment of the invention, the transformer is an equivalence transformer.

According to a further advantageous embodiment of the invention, the reference component exhibits an inductance that essentially corresponds to the inductance of the sensor at a reference point. The reference point corresponds here to the position of the core at which the probe element is not deflected. Particularly precise and exact measurement results can be obtained if the inductance of the reference component corresponds to the inductance of the sensor in the reference point at least in terms of magnitude.

According to a further advantageous embodiment of the invention, the processing device is equipped with an amplifier for the measurement signal of the sensor and with an amplifier for the output voltage of the reference component. It is beneficial that the two amplifiers match. They are identical in design. In this case, the influence of the amplifier on the measurement signal is comparable to the influence of the amplifier on the output voltage of the reference component. The same applies to disturbing effects.

According to a further advantageous embodiment of the invention, the amplifier is a low-noise operational amplifier.

According to a further advantageous embodiment of the invention, the processing device is equipped with a filter for the measurement signal of the sensor and with a filter for the output voltage of the reference component. Most preferably it is a low-pass filter.

According to a further advantageous embodiment of the invention, the filter for the measurement signal of the sensor essentially matches the filter for the output voltage of the reference component. In this case, the influence of the filter on the measurement signal is comparable to the influence of the filter on the output voltage of the reference component. The same applies to disturbing effects.

According to a further advantageous embodiment of the invention, the filters are low-noise.

According to a further advantageous embodiment of the invention, the processing device is equipped with at least one analog/digital converter for the analog sensor signal and with at least one analog/digital converter for the analog output voltage of the reference component. The measurement signal of the sensor and the output voltage of the reference component are registered simultaneously at the measuring times and converted simultaneously in the analog/digital converters. Synchronous sampling therefore takes place.

The method according to the invention occurs in that, on an inductive measuring probe which exhibits a probe element, a sensor with a coil and with a core connected to the probe element in a movable arrangement in relation to the coil, a reference component which converts an analog input voltage into an analog output voltage, a drive device and a processing device, the drive device generates an identical analog input voltage for the sensor and the reference component. The processing device processes the analog measurement signal of the sensor and the analog output voltage of the reference component into a low-noise measurement result. To that end the measurement signal of the sensor and the output voltage of the reference component are registered simultaneously at several measuring times. A reference value is formed from the output voltage of the reference component at several measuring times. At each measuring time the measurement signal of the sensor is offset by a correction value to obtain a measurement result. The correction value is determined from the output voltage of the reference component at the same measuring time and the reference value. Assuming that the influence of the disturbing effects on the output signal of the reference component essentially corresponds to the influence of the disturbing effects on the measurement signal, the measurement signal is offset by a correction value dependent on the disturbing effects. This is performed by the processing device. In this way, the disturbing effects in the measurement signal are minimised or even eliminated.

Instead of a reference value, a reference function that depends on several parameters can be formed from the output voltage of the reference component at several measuring points.

At each measuring time the measurement signal of the sensor is offset by a correction function instead of a correction value to obtain a measurement result. The correction function can be determined from the output voltage of the reference component at the same measuring time and the reference value or reference function, and depends on certain parameters.

According to a further advantageous embodiment of the invention, the reference value is formed as the mean value of the output voltages of the reference component at several measuring times. Other calculation methods are possible.

According to a further advantageous embodiment of the invention, the correction value of the measurement signal at a measuring time is formed as the difference between the reference value and the output voltage of the reference component at the same measuring time.

According to a further advantageous embodiment of the invention, to correct the measurement signal of the sensor at a measuring time the correction value determined at the same measuring time is deducted from the measurement signal.

According to a further advantageous embodiment of the invention, the measurement signal of the sensor and the output voltage of the reference component are amplified by two identical amplifiers. The disturbing effects of the amplifiers here are small compared to the disturbing effects of the sensor.

According to a further advantageous embodiment of the invention, the measurement signal of the sensor and the output voltage of the reference component are filtered by two identical filters. The disturbing effects of the filter are determined using the output voltage of the reference component and eliminated from the measurement signal of the sensor or minimised in the measurement signal of the sensor.

According to a further advantageous embodiment of the invention, the measurement signal of the sensor and the output voltage of the reference component are converted by two identical analog/digital converters. The disturbing effects of the analog/digital converters are determined using the output voltage of the reference component and eliminated from the measurement signal of the sensor or minimised in the measurement signal of the sensor.

Further advantages and advantageous embodiments of the invention can be obtained from the following description, the drawing and the claims.

DRAWING

Figure 2:
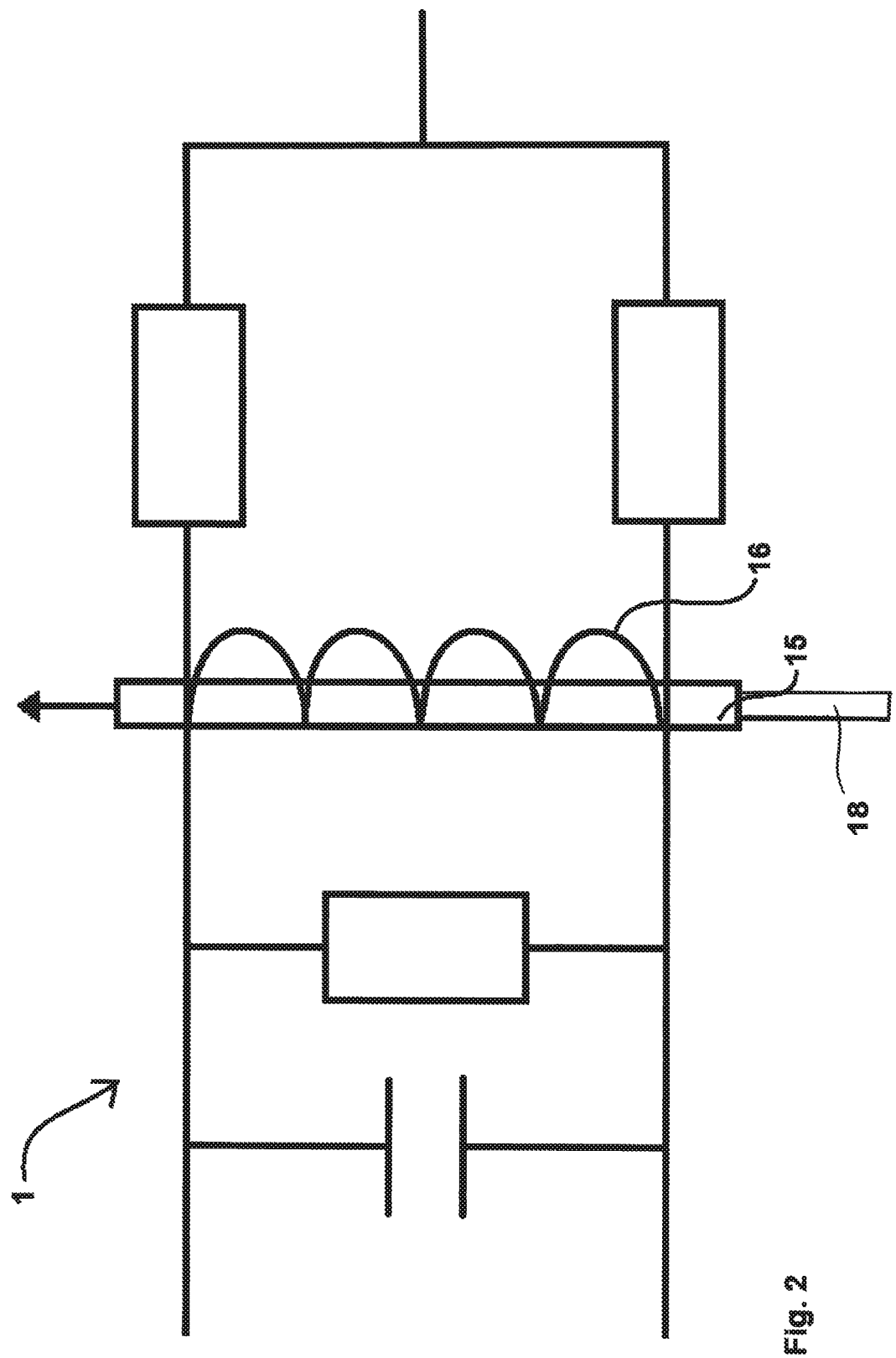
Figure 3:
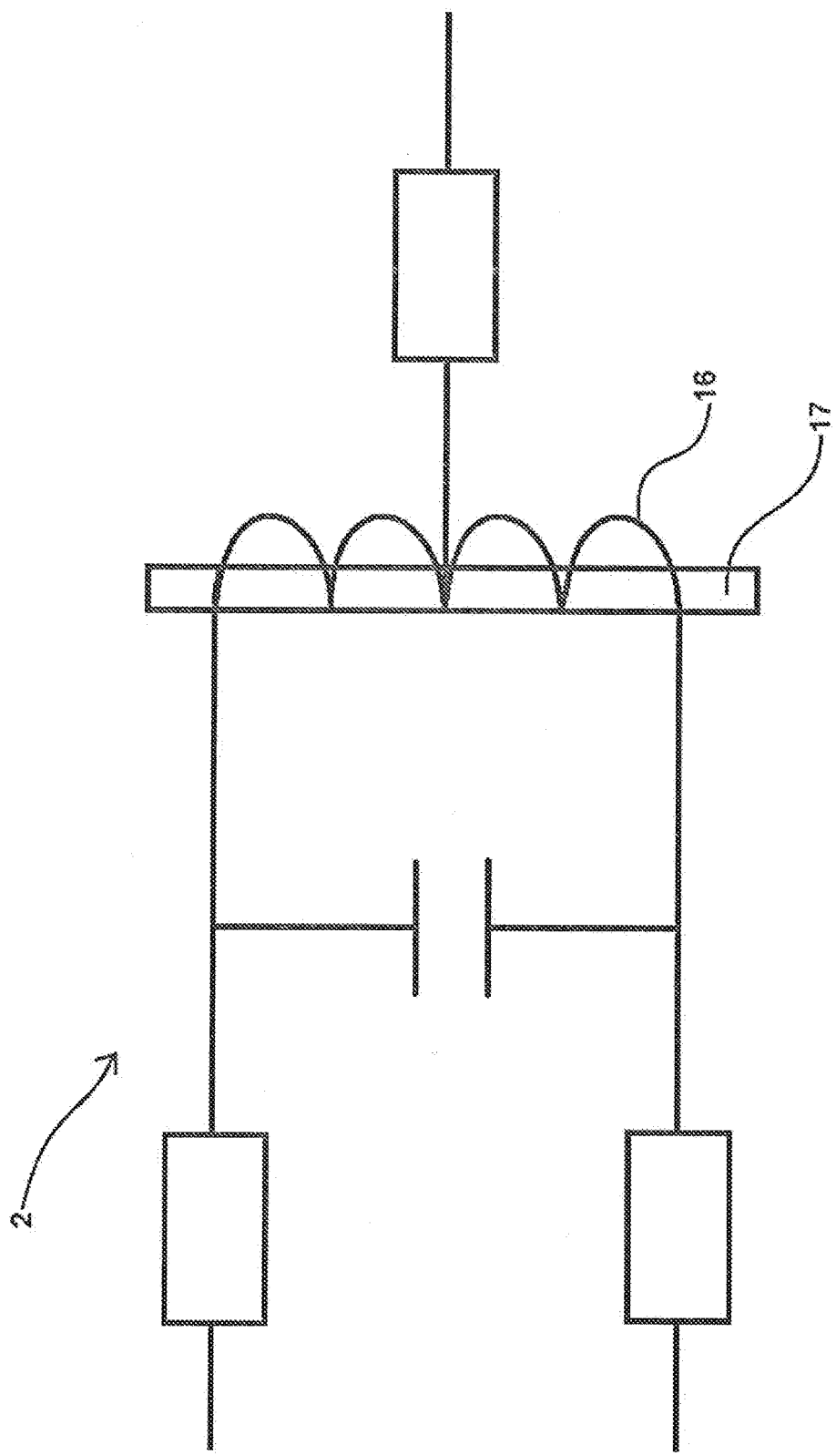

The drawing shows a model embodiment of the invention. Illustrations:

FIG. 1 Circuit configuration of an inductive measuring probe,

FIG. 2 Circuit diagram of a sensor of the inductive measuring probe as shown in FIG. 1, FIG. 3 Circuit diagram of a reference component of the inductive measuring probe as shown in FIG. 1.

DESCRIPTION OF THE EMBODIMENT

FIG. 1 shows a circuit configuration of an inductive measuring probe. The circuit configuration comprises a sensor 1, an electrical reference component 2, a drive device and a processing device. The drive device includes a voltage source 3, a digital/analog converter 4 and two amplifiers 5, 6. The processing device includes two amplifiers 7, 8, two filters 9, 10, two analog/digital converters 11, 12 and a processor 13.

The voltage source 3, the digital/analog converter 4 and the two amplifiers 5, 6 of the drive device supply an input voltage with a specific frequency for the sensor 1 and for the reference component. The input voltages for the sensor 1 and for the reference component 2 are identical.

The sensor 1 exhibits a coil arrangement 14 and a core 15 that can be displaced in relation to the coil arrangement 14. The core is connected to a movable probe element 18 shown in FIG. 2. A change in the position of the core results in an analog measurement signal that is amplified by the amplifier 7, filtered by the filter 9 and converted into a digital signal by the analog/digital converter 11. This is passed on to the processor 13.

The electrical reference component 2 is a transformer. This exhibits a coil arrangement 16 with a core 17, wherein the core 17 is not movable in relation to the coil arrangement 16. The inductance of the coil arrangement 16 essentially corresponds to the inductance of the coil arrangement 14 of the sensor. The reference component converts the analog input voltage into an analog output voltage. The ratio of input voltage to output voltage depends on the coil arrangement of the transformer. The output voltage is amplified by the amplifier 8, filtered by the filter 10 and converted into a digital signal by the analog/digital converter 12. This is passed on to the processor 13.

FIG. 2 shows a circuit diagram of the sensor 1 with its electrical properties. FIG. 3 shows the reference component 2 with its electrical properties.

The processor 13 calculates a measurement result from the measurement signal and the output voltage. It is assumed here that the measurement signal and the output voltage of the reference component are influenced by disturbing effects. It is assumed that the measurement signal $U_{meas}$ of the sensor at a particular measuring time $t_1$ corresponds to the sum of a mean value of several measurement signals at various measuring times and the disturbing effects $n_{meas}$:

$$U_{meas}(t_1) = \text{mean value } (U_{meas}) + n_{meas}$$

The same is assumed for the output voltage $U_{refence}$ of the reference component at the same measuring time $t_1$. It is assumed that $U_{refence}(t_1)$ is the sum of a mean value for several output voltages of the reference component at various measuring times and the disturbing effects $n_{reference}$:

$$U_{reference}(t_1) = \text{mean value } (U_{reference}) + n_{reference}$$

The mean value of several output voltages of the reference component is formed across a number of measuring times. This mean value corresponds to the reference value.

It is assumed that the disturbing effects $n_{meas}$ and $n_{reference}$ are predefined by the sum of the disturbing effects of the individual components:

$$n_{meas}^2 = n_{sensor}^2 + n_{amplifier1}^2 + n_{ADC1}^2$$

and $$n_{reference}^2 = n_{component}^2 + n_{amplifier2}^2 + n_{ADC2}^2$$

wherein $n_{sensor}$ is the disturbing effects of the sensor 1, $n_{amplifier1}$ the disturbing effects of the amplifier 7 and the filter 9, $n_{ADC1}$ the disturbing effects of the analog/digital converter 11, $n_{component}$ the disturbing effects of the reference component 2, $n_{amplifier2}$ the disturbing effects of the amplifier 8 and the filter 10, and $n_{ADC2}$ the disturbing effects of the analog/digital converter 12. Because the sensor 1 and the reference component have roughly matching electrical properties, it is assumed that the disturbing effects $n_{sensor}$ of the sensor 1 and the disturbing effects $n_{component}$ of the reference component 2 essentially match:

$$n_{sensor} = n_{component}$$

Furthermore it is assumed that $$n_{sensor} >> n_{amplifier}, n_{ADC}$$

The processor therefore calculates the disturbing effects $n_{reference}$ from the difference between the output voltage of the reference component at a measuring time $t_1$ and the reference value. These disturbing effects $n_{reference}$ are then deducted from the measurement signal. The result is the measurement result.

All features of the invention can be material to the invention both individually and in any combination.

REFERENCE NUMBERS

1 Sensor
2 Reference component
3 Voltage source
4 Digital/analog converter
5 Amplifier
6 Amplifier
7 Amplifier
8 Amplifier
9 Filter
10 Filter
11 Analog/digital converter
12 Analog/digital converter
13 Processor
14 Coil arrangement
15 Core
16 Coil arrangement
17 Core

The invention claimed is:
1. An inductive measuring probe:
   with a movably arranged probe element,
   with a sensor having a coil arrangement and a core which is arranged such that it can be displaced in relation to the coil arrangement and which is connected to the probe element, wherein the sensor converts a deflection of the probe element into an analog measurement signal,
   with an electrical reference component which converts an analog input voltage into an analog output voltage, the electrical reference component comprising a transformer,
   with a drive device which generates an identical analog input voltage for the sensor and the reference component, the drive device comprising a voltage source,
   with a processing device
      which determines a correction value or a correction function, the correction value or the correction function depending on disturbing effects and being determined from the analog output voltage of the refer- ence component determined at the same measuring time that the analog measurement signal is measured, the disturbing effects being distortions of at least one of the analog measurement signal and the analog output voltage, which determines a measurement result from the analog measurement signal and the correction value or the correction function, and which comprises a processor, with a circuit configuration which encompasses the sensor, the reference component, the drive device, and the processing device.

2. The inductive measuring probe according to claim 1, wherein the transformer is an equivalence transformer.

3. The inductive measuring probe according to claim 1, wherein the reference component exhibits an inductance that essentially matches the inductance of the sensor at a predefined reference point.

4. The inductive measuring probe according to claim 1, wherein the processing device further comprises at least two analog/digital converters for the analog measurement signal of the sensor and for the analog output voltage of the reference component.

5. The inductive measuring probe according to claim 1, wherein the processing device further comprises:

a first amplifier for the measurement signal of the sensor and a second amplifier for the output voltage of the reference component.

6. The inductive measuring probe according to claim 5, wherein the first amplifier for the measurement signal of the sensor essentially matches the second amplifier for the output voltage of the reference component.

7. The inductive measuring probe according to claim 5, wherein the first and second amplifier are each a low-noise operational amplifier.

8. The inductive measuring probe according to claim 1, wherein the processing device further comprises a first filter for the measurement signal of the sensor and a second filter for the output voltage of the reference component.

9. The inductive measuring probe according to claim 8, wherein the first filter for the measurement signal of the sensor essentially matches the second filter for the output voltage of the reference component.

10. The inductive measuring probe according to claim 8, wherein the first and second filter are each low-noise.

11. A method for operating an inductive measurement probe, which exhibits a probe element, a sensor having a coil arrangement and a core which is connected to the probe element and is movably arranged in relation to the coil arrangement, a reference component which converts an analog input voltage into an analog output voltage, the reference component comprising a transformer, a drive device which generates an identical analog input voltage for the sensor and the reference component, the drive device comprising a voltage source, and a processing device which combines the analog measurement signal of the sensor and the analog output voltage of the reference component into a measurement result, the processing device comprising a processor, the method comprising the following process steps:

detection of a measurement signal with the sensor at various measuring times, simultaneous detection of the output voltage of the reference component at each of the measuring times, formation of a reference value or a reference function from the output voltages of several measuring points of the reference component, and correction of the measurement signal of the sensor at every measuring time by a correction value dependent on disturbing effects and determined from the output voltage of the reference component at the same measuring time and from the reference value, the disturbing effects being distortions of at least one of the measurement signals and the output voltage, or correction of the measurement signal at every measuring time by a correction function dependent on disturbing effects and determined from the output voltage of the reference component at the same measuring time and from the reference value or the reference function, the disturbing effects being distortions of at least one of the measurement signal and the output voltage.

12. The method according to claim 11, wherein the reference value is formed as the mean value of the output voltages of the reference component at several measuring times.

13. The method according to claim 11, wherein the measurement signal of the sensor and the output voltage of the reference component are amplified by two identical amplifiers respectively having low disturbing effects compared with the disturbing effects of the sensor.

14. The method according to claim 11, wherein the measurement signal of the sensor and the output voltage of the reference component are filtered by two identical filters respectively so that the disturbing effects of the filter from the output voltage of the reference component are determined and eliminated from the measurement signal of the sensor.

15. The method according to claim 11, wherein the measurement signal of the sensor and the output voltage of the reference component are converted simultaneously by two identical analog/digital converters, and wherein the disturbing effects of the analog/digital converters are determined from the output voltage of the reference component and eliminated from the measurement signal of the sensor.

16. The method according to claim 11, wherein the correction value of the measurement signal at a measuring time is formed as the difference between the reference value and the output voltage of the reference component at the same measuring time.

17. The method according to claim 16, wherein to correct the measurement signal of the sensor at a measuring time the correction value determined at the same measuring time is deducted from the measurement signal.

\* \* \* \* \*